United States Patent Office 3,806,390
Patented Apr. 23, 1974

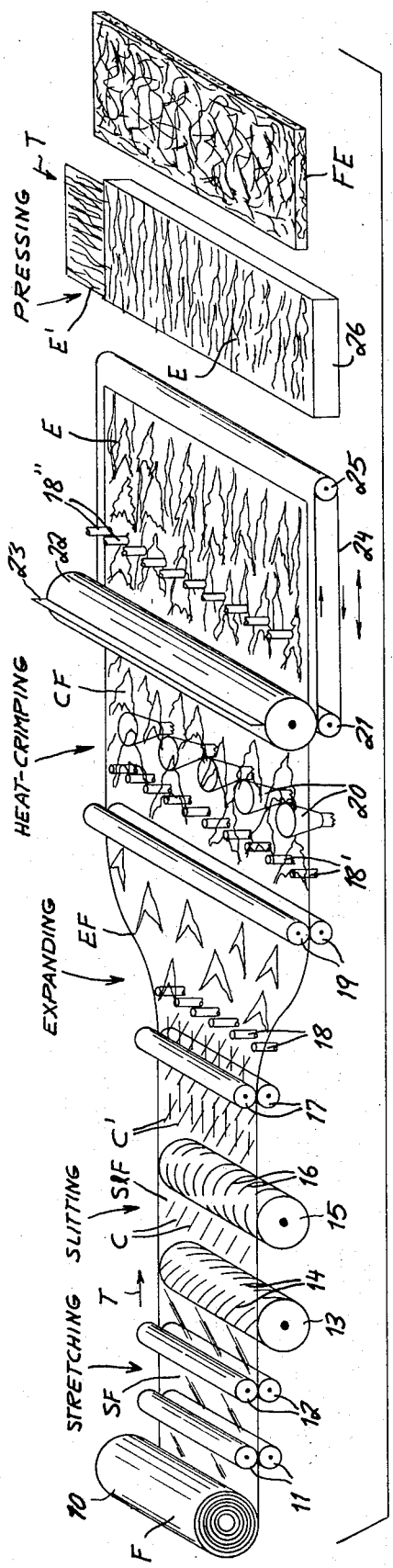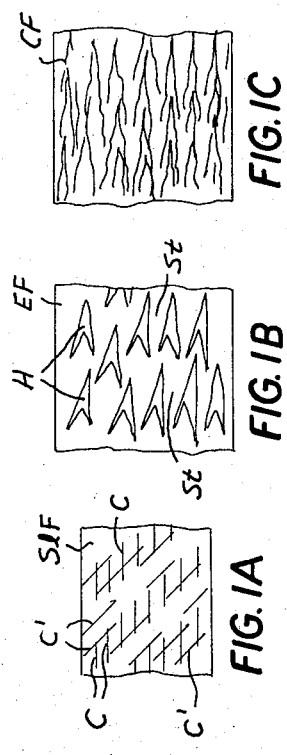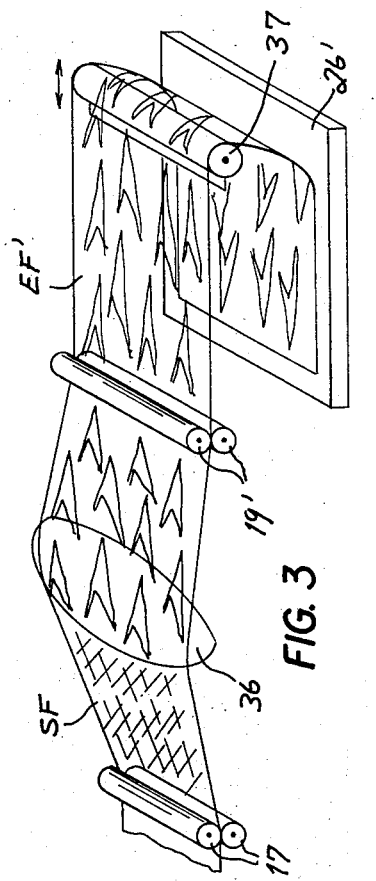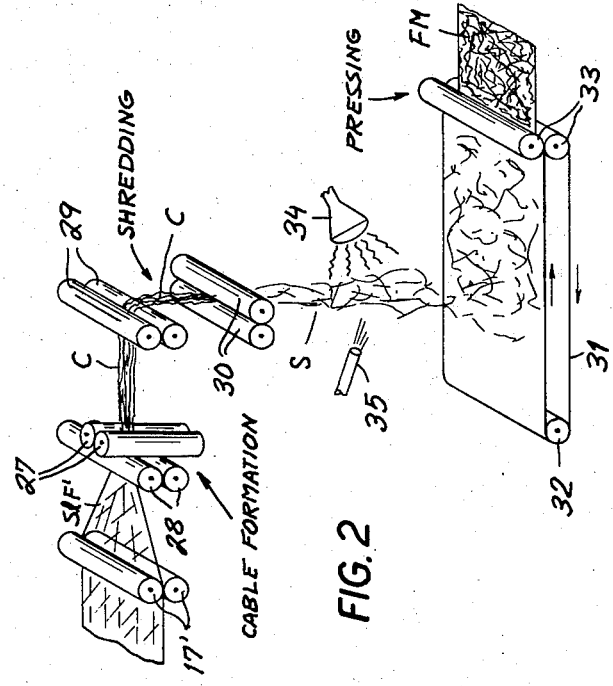

3,806,390
METHOD OF MAKING A SYNTHETIC RESIN-FIBER MAT
Hermann Balk and Fritz Reifenhauser, Troisdorf, Germany, assignors to Reifenhauser KG, Troisdorf, Germany
Filed Mar. 31, 1972, Ser. No. 240,173
Int. Cl. B32b 31/18
U.S. Cl. 156—229    8 Claims

ABSTRACT OF THE DISCLOSURE

A thermoplastic synthetic-resin film is longitudinally oriented (stretched) and then slit longitudinally at a multiplicity of locations such that the slits are longer than their transverse spacing and are more or less randomly distributed. The slit film is then expanded into an openwork, e.g. by air jets, with the fiber strands formed by the slitting running at various angles to the longitudinal direction of the film. The web can thereafter be head-crimped and then cut or torn into individual web elements which are piled and pressed to form a fiber mat or felt.

(1) FIELD OF THE INVENTION

The present invention relates to a method of making a fiber mat or fleece. More particularly this invention concerns the production of a coherent fluid-permeable synthetic-resin mat.

(2) BACKGROUND OF THE INVENTION

Synthetic-resin felt, mat or fleece is often used as an inexpensive replacement for natural-fiber mats, e.g. as textile substitutes, filter layers, fillers. The use of synthetic resins expands the roles which felt or fiber mats may fulfill since many synthetic resins are substantially more durable than natural fibers. Air-conditioner filters, for example, made of synthetic-resin fibers are not as sensitive to water as many natural fibers, and may be washed with impunity.

Customarily such fluid-permeable synthetic-resin mats or fleeces are made by randomly piling individual fibers which, in turn, may be produced by longitudinally orienting a synthetic-resin foil and then slitting it. The slit, stretched foil is then reduced to discrete fibers by being cut up at the desired staple length and the fibers so produced are thereafter matted by the same processes used for natural fibers. Thus, in addition, to the steps of willowing, separating, orienting, and pressing must be added the various steps required to produce these synthetic-resin fibers. Apart from the additional steps and their expense, the problem of handling the masses of individual fibers arises.

(3) OBJECTS OF THE INVENTION

It is therefore an object of the present invention to provide an improved method of making a synthetic-resin fiber mat, felt, or fleece.

Another object is the provision of an improved process for making a fluid-permeable mat from synthetic-resin film or foil.

Yet another object is to provide a simple and economical method of making such a felt which overcomes the disadvantages of the prior-art methols described above.

(4) SUMMARY OF THE INVENTION

These objects are attained according to the present invention by slitting a synthetic-resin thermoplastic film longitudinally and thereafter expanding this slit, and advantageously stretched, film laterally to form an openwork web defined by a multiplicity of interconnected fiber-like strands. This web or mesh can be laid transversely across a similarly formed web without the necessity of subdividing it into individual small fibers.

The openwork web is easy to handle and can be used as is by laying it across another such web, that is, with the axis of elongation or stretch transverse so that of the web directly underneath, and then hot-pressing the stock to form a mat or fleece which has essentially the same properties as a natural-fiber mat or felt. No messy orienting and layering of hard-to-handle fibers is required.

The slit film may be expanded mechanically or by means of an air jet. It is also possible to form the slit film into a cable and then shred this cable by axially pulling it apart to reduce it to a plurality of small integral slit patches which may be simply compressed by a roller press into a coherent mat. These patches, although inherently expanded by the shredding operation, are expanded by an air jet as discussed above or by transverse stretching at a crimping station or at a piling station at which the conventional heat-shrinking and stacking means can be provided.

According to another object of the present invention the slit and expanded sheet may be crimped. This is advantageously done by the action of heat when a thermoplastic resin such as polyethylene is used. Since the synthetic-resin foil is uniaxially oriented, heat will cause the plastic-memory effect to manifest itself and produce a crimping.

(5) DESCRIPTION OF THE DRAWING

The above and other objects, features, and advantages will become more readily apparent from the following description, reference being made to the accompanying drawing in which:

FIG. 1 is a schematic diagram illustrating principles of the method according to the present invention;

FIGS. 1A, 1B, and 1C are top views of the film at three stages in the production of a felt according to FIG. 1;

FIG. 2 is another diagram illustrating an alternate method according to the present invention; and FIG. 3 is yet another diagram showing another method of expanding the film according to the instant invention.

(6) SPECIFIC DESCRIPTION

As shown in FIG. 1 a roll 10 of polyethylene film F is fed between a pair of driven rollers 11 downstream of which, relative to a transport direction T, is a second pair of rollers 12 which are driven at a greater speed to stretch the foil F, thereby making it into a stretched film SF which is uniaxially oriented in the direction T. Immediately downstream of the rollers 12 is a large roller 13 provided with a plurality of blades 14 which lie at an angle to the direction T and form cuts longitudinal more or less at random and of a length much greater than the transverse spacing. Another driven roller 15 is provided slightly downstream of roller 13 and has blades 16 which form additional cuts C' parallel to direction T. Some of the cuts C intersect some of the cuts C' but the slit foil S1F so formed remains unitary, as best shown in FIG. 1A.

After passing through another pair of driven transport rollers 17 the slit film SIF passes over an expanding station having a plurality of sharp air jets 18 which expand it up into an expanded film EF. This film EF is shown in FIG. 1B where it can be seen that it is in the form of an openwork web having a mass of holes H defined by individual fiber strands St. Similar nozzles are provided at 18' and 18" in the subsequent crimping and piling apparatuses.

Downstream of the jets 18 are a wide pair of driven rollers 19 which advance the film EF over a plurality of heat lamps 20 which heat-crimp the film EF, making it into the crimped film CF shown in FIG. 1C. This crimping causes all of the strands St to shorten slightly and close their straightness.

Finally the crimped film CF is cut up into integral or unitary film elements E by a pair of rollers 21 and 22 the upper of which is of substantial diameter and is provided with a transverse blade 23 that longitudinally subdivides the elongate film. Each element E is advanced by an endless band 24 stretched over the roller 21 and a roller 25 and laid on a press platen 26 on which there is already a similar element E'. The elements E are of course uniaxially oriented in the direction T; the elements E' are similarly made and oriented in a direction T' orthogonal to direction T. The stack is made with the elements E and E' alternating.

Another heatable press platen similar to platen 26 is finally used to compress the stack of elements E and E' into a single unitary felt or fiber mat as shown at FE in FIG. 1. This felt FE may be used as an air filter, as packing, or for any of a great many purposes.

In FIG. 2 a slit film SIF' produced as shown in FIG. 1 is pulled from rollers 17' and by two closely spaced and mutually orthogonal pairs of rollers 27 and 28. The film SIF' is a two-layer laminate whose layers have different properties, for instance one is stretched and one is not, or one is polyethylene and other is a polyamide, so that on subsequent heating a very pronounced crimping is effected. These rollers 27 and 28 form the slit film SIF' into a cable which is gripped by a pair of rollers 29 located above a further pair of rollers 30. The rollers 27 and 28 do not grasp the cable C tightly, but the rollers 29 and 30 do. In addition the rollers 30 are driven much faster than the rollers 29 to rip the cable C into shreds S. A belt 31 spanned over a roller 32 receives these shreds S and feeds them between a pair of heated pressing rolls 33 to form a fiber mat FM essentially identical to the felt FE. The heat of the rollers 33 may serve to crimp them. The shredding operation serves to expand the slit film SIF', and their haphazard fall to the belt 31 serves to orient them at random to insure that the finished fiber mat FM is equally strong in every direction. It is of course possible to provide a heat lamp 34 and an air nozzle 35 to crimp and expand the shreds S.

In the embodiments of FIGS. 1 and 2 only enough heat and pressure is used to make a coherent felt or mat. The desired product should be relatively spongy yet should not shed at all. This goal is particularly easy to achieve according to the present invention because there are no individual fibers. The only "fibers" are those formed by the strands into which the film F is expanded. Thus it is possible to use a minimal amount of heat to ensure maximum sponginess in the finished product.

In FIG. 3 the slit film SIF of FIG. 1 is pulled by long roller 19' over a large round obstacle 36 to mechanically expand the film. As the film SIF is pulled over the element 36 it is stretched principally transverse to the direction T to open it up and transform the cuts C and C' into the holes H.

Downstream of the rollers 19' is a cuttling device 37 that reciprocates horizontally to lay the expanded film EF' on a press platen 26'. It would also be possible for the cuttling device 37 to lay the film EF' on a continuously moving transport band such as the one shown at 31 in FIG. 2 which advances at a rate many times slower than the rate of advance through the rollers 19' to feed the thus piled film to a roller press such as shown at 33 in FIG. 2. This embodiment, therefore, shows that it is possible to use a film which has merely been slit and expanded. It should be noted that on transverse expansion of the film the strands formed by the cuts are all pulled to lie at various angles to the transport direction, so that even in an arrangement as shown in FIG. 3 the finished product will be essentially as strong transverse to the transport direction as parallel to it. Slitting is an inherently longitudinal operation, but the expansion of the film according to the present invention pulls the strands out of line with the transport direction, indeed, some of the strands even run at right angles to it after expansion, so that the finished mat or felt is not strong in only one direction.

The fleece-formation or matting according to the present invention is produced without much of the difficulty inherent in prior-art methods, since the film is left either completely in one piece or at least in large elements. No individual fibers need be arranged with great difficulty on a press platen. In the press of the present system only a slight pressure need be applied to compact the pile which is heated to fuse the elements together. Stacking is easy because an even depth of the stack is produced automatically, no grading of a mass of fibers is required. Finally, the finished product is similar to the prior art mats except that it can be compressed either with less heat and pressure or with less use of a binder because the integral expanded sheets are more easily formed into an unitary mass than a mass of individual fibers.

We claim:

1. A method of making a fiber mat comprising the steps of:
   slitting a thermoplastic synthetic-resin film at a multiplicity of locations;
   expanding the slit synthetic-resin film into an openwork web defined by fiber strands slit from the film and unitary therewith;
   piling pieces of the expanded openwork web;
   uniting the piled pieces of the expanded openwork web into a fibrous mat, said film being stretched in at least one direction and said pieces being superposed layers of the openwork web, at least one of said layers having its orientation directions laying transverse to the orientation direction of at least one other layer; and
   crimping said openwork web prior to the piling of pieces thereof.

2. The method defined in claim 1 wherein said piled pieces are united by heating and pressing the pile.

3. The method defined in claim 1, further comprising the step of subdividing said web into a plurality of web elements, said elements being stacked with their orientation directions crossing upon piling of the pieces of the expanded open work web.

4. The method defined in claim 4 wherein said slit strands are expanded by blowing on same with a high-pressure air jet.

5. A method of making a fiber mat comprising the steps of:
   slitting a thermoplastic synthetic-resin film at a multiplicity of locations;
   expanding the slit synthetic-resin film into an openwork web defined by fiber strands slit from the film and unitary therewith;
   piling pieces of the expanded openwork web;
   uniting the piled pieces of the expanded openwork web into a fibrous mat;
   forming said web into a cable and ripping said cable into shreds, said shreds constituting said layers.

6. The method defined in claim 5 wherein said piled pieces are united by heating and pressing the pile.

7. The method defined in claim 5, further comprising the step of crimping said open work web pile to the piling of pieces thereof.

8. The method defined in claim 5 wherein said slit film is expanded by blowing on same with a high-pressure air jet.

References Cited

UNITED STATES PATENTS

| | | | |
|---|---|---|---|
| 3,328,227 | 6/1967 | Moseley et al. | 156—252 X |
| 3,615,998 | 10/1971 | Kolb et al. | 156—229 X |
| 3,713,942 | 11/1973 | Kim | 156—252 |

EDWARD G. WHITBY, Primary Examiner

U.S. Cl. X.R.

156—252, 257, 264, 324, 495, 517